W. A. Wood,
Mower.
No. 19002. Patented Dec. 29, 1857.
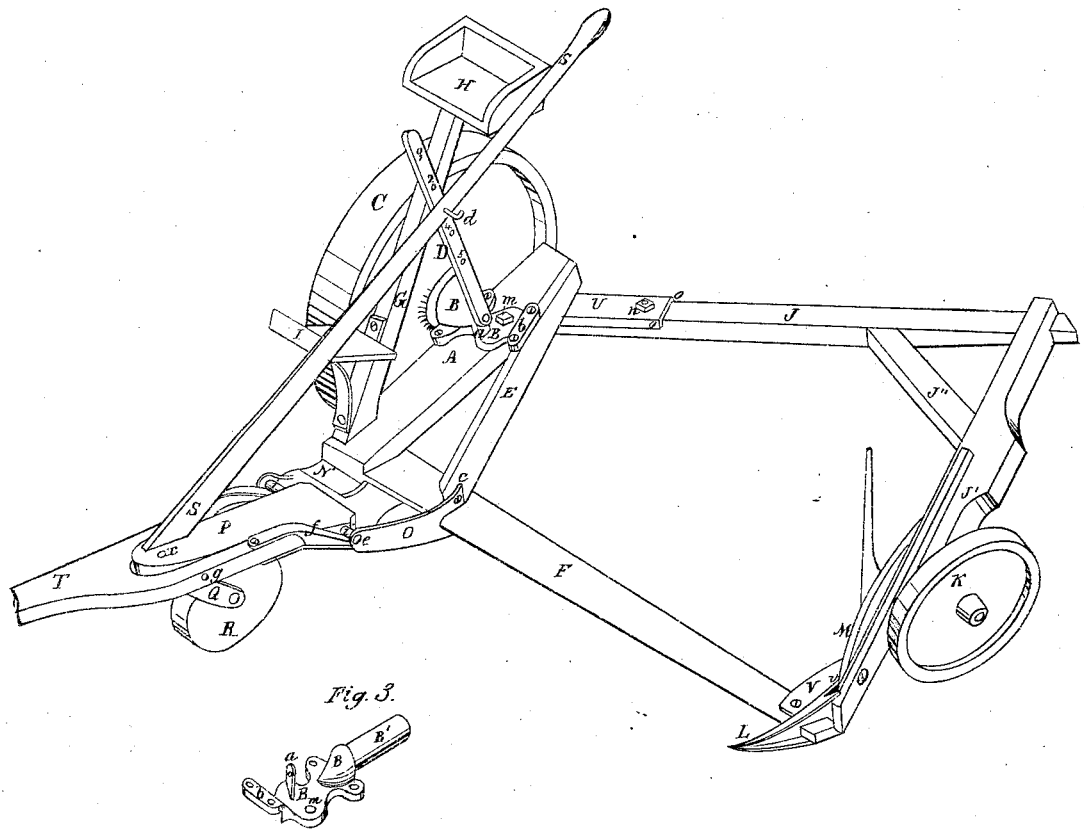
Fig. 3.
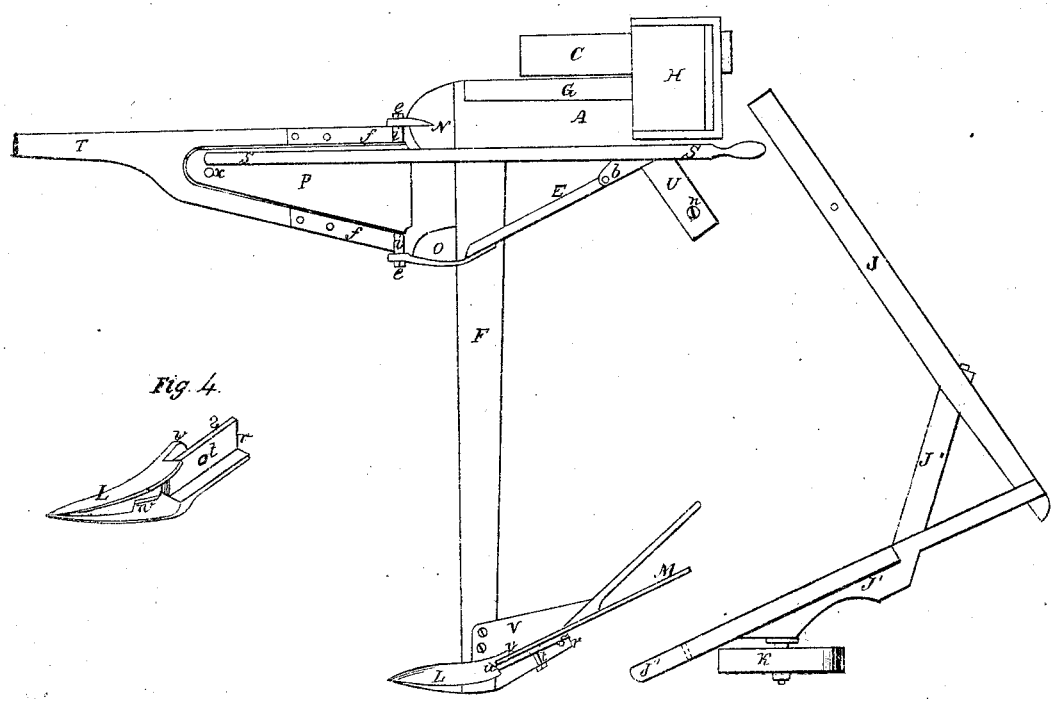
Fig. 2.
Fig. 4.

UNITED STATES PATENT OFFICE.

WALTER A. WOOD, OF HOOSICK FALLS, NEW YORK.

IMPROVEMENT IN HARVESTERS.

Specification forming part of Letters Patent No. 19,002, dated December 29, 1857.

*To all whom it may concern:*

Be it known that I, WALTER A. WOOD, of Hoosick Falls, in the county of Rensselaer and State of New York, have invented certain new and useful Improvements in Detachable Frames for Harvesters; and I do hereby declare the following to be a full, clear, and exact description of the construction and operation of the same, reference being had to the accompanying drawings, making a part of this specification, in which—

Figure 1 represents a perspective view of the frame when united to the other parts of the machine. Fig. 2 represents a top plan with the removable portion detached and removed a short distance from its place. Fig. 3 represents one of the irons detached. Fig. 4 represents the outside divider and shoe, also detached from the machine.

Similar letters of reference, where they occur in the several figures, denote like parts of the machine in all of them.

In mowing standing grass a frame in rear of the cutter-bar and an outside supporting-wheel are found very advantageous; but in lodged or tangled grass they cannot be used unless an extra hand follows to throw off the grass from the frame-work as the machine advances. This is expensive, and with a view of making a machine that shall be efficient under all ordinary circumstances, and yet be simple enough for any farmer to change or adapt to all the ordinary kinds of mowing, I have devised this invention, which consists in so constructing the frame in rear of the finger-bar as that it may be entirely removed when lodged grass is to be cut, but at the same time so that the machine, with the driver and the track-clearer upon it, shall preserve its balance, the change allowing the cutter-bar, shoe, and track-clearer to pass under the tangled grass, and which they cannot do when the frame and outside wheel are attached.

To enable others skilled in the art to make and use my invention, I will proceed to describe so much of it as relates more especially to the parts claimed as new, merely enumerating the other parts of the machine.

A is a part of the frame, to which the casting B is attached, said casting having upon it the journal B', upon which the supporting-wheel C is placed.

D is a brace pivoted to a lug, $a$, on said casting B for the hoisting and lowering lever S to rest upon.

E is a brace extending from the piece A to the finger-bar F.

G is a support for the driver's seat H, and I is his feet-support.

J J' J" is a portion of the frame, which is immediately in rear of the cutter or finger bar, and K is an outside supporting-wheel connected to the frame J. As these parts, with their several connections and relation to the cutter-bar, track-clearer, and shoe, and the maintenance of the balancing of the machine, are what constitute my invention, I shall hereinafter more particularly describe them.

L is the shoe; M, the track-clearer.

N O are castings fastened to the cutter-bar F, and to which is hinged the caster-block P.

Q is the caster-crotch, and R the caster-wheel; S, a lever extending from the caster-block P to the driver's seat H.

T is the tongue, which is also hinged to the ends of the castings N O.

In order that the frame may be as light as possible, and yet strong enough to withstand the strain it must encounter, the points of connection are mainly of iron, and so tied as to cause the iron to take the main part of the strain, and thus the pieces B L O N, though all accomplishing other important functions, are used as ties at the joints of the frame. There is also a fifth piece, U, which is secured to the frame-piece A and also to said frame and the casting B by a screw-bolt, $m$, passing through them, and also through the rear frame-piece, J. A screw-bolt, $n$, also passes through the iron U and the frame-piece J, and there are flanges $o$ on said iron to catch and hold the sides of said piece J. Where the two pieces of the frame J J meet there is a brace, J", to strengthen that junction. This brace J" at that point is not in the way; but such a brace at either of the other three corners of the frame would make a place for the grass to lodge upon, and could not be used. There is a recess, $r$, on the rear outside of the shoe, and a rib, $s$, cast upon it, into which recess and to which rib the forward point or part of the frame-piece J' is connected by a screw-bolt, $t$, which passes through the rib $s$ and through the piece J'. The track-clearer is fastened by a springplate, V, to the finger-bar, and its point $u$ plays between the rib $s$ and a projection, $v$, inside of it, but all cast with the shoe. The finger-bar passes through a mortise, $w$, in the shoe, and thus it is made a tie for holding firmly together all the parts at that corner of the machine.

The wheel K, as heretofore described, is connected to the frame-piece J', and so that when said frame J J' J'' is connected to the machine the wheel shall balance it, but leave it under the control of the driver in his seat. So, also, when said frame is taken off, as shown in Fig. 2, the balancing of the machine shall still be preserved, and be equally under the control of the driver in his seat. The disconnecting and removing of the frame J J' J'' and the wheel K in no wise impairs the action of the remaining portions of the machine for cutting tangled grass, and it can be readily done in the field; and to readily adapt a harvesting-machine to every contingency or special kind of work that may be required of it adds materially to its value and economy.

$b$ is the part of the casting B which ties the pieces A E together.

$c$ is a part of the casting O that ties E and F together.

$d$ is the pin for holding the brace D and lever S together at any of the adjusting-holes 1 2 3 4 5.

$e$ is the rod or bolt, by which the tongue T and caster-block P are hinged to the shoe-pieces N O.

$f f$ are the tongue-irons, and $i i$ the dead-eyes turned on them, through which the bolt $e$ passes; $g$, a bolt-hole through the forks of the tongue and through the caster-block, so as to make a rigid connection between them, when for any purpose it may be desirable.

$x$ is the pivot to which the caster-crotch Q is hung.

Having thus fully described the nature and object of my invention, what I claim therein as new, and desire to secure by Letters Patent; is—

So constructing the frame of a combined reaping and mowing machine and combining it with a spring track-clearer as that all that part of the frame in rear of the cutter-bar may be disjointed and removed by simply taking out the bolts $m n t$, said track-clearer remaining attached, for the purpose of adapting the machine to the cutting of tangled or lodged grass without obstruction, while the machine, with the driver upon it, remains perfectly balanced, as herein set forth.

WALTER A. WOOD.

Witnesses:
 CHAS. H. KING,
 H. E. THAYER.